US008135942B2

(12) United States Patent
Abernathy et al.

(10) Patent No.: US 8,135,942 B2
(45) Date of Patent: Mar. 13, 2012

(54) SYSTEM AND METHOD FOR DOUBLE-ISSUE INSTRUCTIONS USING A DEPENDENCY MATRIX AND A SIDE ISSUE QUEUE

(75) Inventors: Christopher M. Abernathy, Austin, TX (US); Mary D. Brown, Ausin, TX (US); Todd A. Venton, Austin, TX (US); John B. Griswell, Jr., Austin, TX (US)

(73) Assignee: International Business Machines Corpration, Armonk, NY (US)

( * ) Notice: Subject to any disclaimer, the term of this patent is extended or adjusted under 35 U.S.C. 154(b) by 551 days.

(21) Appl. No.: 12/199,971

(22) Filed: Aug. 28, 2008

(65) Prior Publication Data

US 2010/0058033 A1     Mar. 4, 2010

(51) Int. Cl.
*G06F 9/50*     (2006.01)
*G06F 9/52*     (2006.01)
*G06F 9/312*     (2006.01)

(52) U.S. Cl. ........................... 712/216; 712/217
(58) Field of Classification Search ................... 712/217, 712/216
See application file for complete search history.

(56) References Cited

U.S. PATENT DOCUMENTS

| 6,065,105 | A | 5/2000 | Zaidi et al. | |
|---|---|---|---|---|
| 6,334,182 | B2 | 12/2001 | Merchant et al. | |
| 7,085,917 | B2 | 8/2006 | Busaba et al. | |
| 2003/0056020 | A1* | 3/2003 | Chaudhry et al. | 709/313 |
| 2003/0061466 | A1* | 3/2003 | Samra et al. | 712/217 |
| 2003/0191925 | A1 | 10/2003 | Ernst et al. | |
| 2004/0015929 | A1* | 1/2004 | Lewis et al. | 717/156 |
| 2006/0179226 | A1* | 8/2006 | Guthrie et al. | 711/125 |
| 2006/0271820 | A1 | 11/2006 | Mack et al. | |
| 2007/0043932 | A1* | 2/2007 | Kulkarni et al. | 712/214 |
| 2010/0058035 | A1* | 3/2010 | Abernathy et al. | 712/217 |

OTHER PUBLICATIONS

Nguyen et al., "System and Method for Predictive Early Allocation of Stores in a Microprocessor".
Kailas et al., "Method and System for Partial on-Demand Register Renaming and Out-of-Order Execution".

* cited by examiner

*Primary Examiner* — Daniel Pan
(74) *Attorney, Agent, or Firm* — Patrick E. Caldwell, Esq.; The Caldwell Firm, LLC

(57) ABSTRACT

A method receives a complex instruction comprising a first portion and a second portion. The method sets a single issue queue slot and allocates an execution unit for the complex instruction, and identifies dependencies in the first and second portions. The method sets a dependency matrix slot and a consumers table slot for the first and section portion. In the event the first portion dependencies have been satisfied, the method issues the first portion and then issues the second portion from the single issue queue slot. In the event the second portion dependencies have not been satisfied, the method places the second portion into a side issue queue. The method issues the second portion when the side issue queue indicates that the second portion is eligible for issue.

16 Claims, 10 Drawing Sheets

SYSTEM AND METHOD FOR DOUBLE-ISSUE INSTRUCTIONS USING A DEPENDENCY MATRIX AND A SIDE ISSUE QUEUE

TECHNICAL FIELD

The present invention relates generally to the field of computer architecture and processing and, more particularly, to a system and method for double-issue instructions using a dependency matrix and a side issue queue.

BACKGROUND OF THE INVENTION

Modern electronic computing systems, such as microprocessor systems, typically include a processor and datapath configured to receive and process instructions. Generally, instructions are either "simple" or "complex." Typical simple instructions encompass a single operation, such as, for example, a load or store from memory. Common Reduced Instruction Set Computers (RISC) employ simple instructions exclusively. Complex instructions typically encompass more than one single operation, such as an add/store, for example. Common Complex Instruction Set Computers (CISC) employ complex instructions and sometimes also employ simple instructions. Both simple and complex instructions are subject to dependencies.

Generally, a dependency occurs where an instruction requires data from sources that are themselves the result of another instruction. For example, in the instruction sequence:
ADD $8, $7, $5
SW $9, (0)$8
The ADD (add) instruction adds the contents of register $7 to the contents of register $5 and puts the result in register $8. The SW (store word) instruction stores the contents of register $9 at the memory location address found in $8. As such, the SW instruction must wait for the ADD instruction to complete before storing the contents of register $8. The SW instruction therefore has a dependency on the ADD instruction. The illustrated dependency is also known as a read-after-write (RAW) dependency.

One common approach to tracking dependencies is a "dependency matrix," such as that described in U.S. Pat. Nos. 6,065,105 and 6,334,182. Generally, a conventional dependency matrix includes rows and columns. Each bit or element, i.e., the intersection of one row and one column, corresponds to a dependency of an instruction in the issue queue. Each instruction in the issue queue is associated with a particular row in the dependency matrix, with the read-after-write (RAW) dependencies noted by bits set on a given column within that row.

As a given resource becomes available, the dependency matrix clears the column associated with that resource, setting all locations in the column to zero. Once a given instruction (row) has all of its RAW dependencies resolved, i.e. once all columns in that row have been set to zero, then the instruction is ready to issue.

As new instructions enter the issue queue, allocation logic assigns the new instructions to a position within the dependency matrix. The dependency matrix logic checks sources for that instruction against a destination register file. A match between an entering instruction's source and a pending instruction's destination indicates that the entering instruction is dependent on the pending entry, and the dependency matrix logic sets the bit in the appropriate position in the dependency matrix. The newly entered instruction will not issue from the issue queue until after the instruction on which it depends has issued, as indicated by the dependency matrix.

Conventional dependency matrices can only handle an instruction that needs to issue only once. This limits the speed and functionality of a system using conventional dependency matrices, because an instruction that needs to be utilized multiple times must be reinserted into the dependency matrix each time the instruction is needed. This increases the total time necessary to execute the instruction.

For example, as described above, complex instructions involve multiple parts. In systems using conventional dependency matrices, these instructions must be cracked into separate instructions, assigning each resultant separate instruction to a separate position within the dependency matrix and the issue queue, thereby limiting the quantity of instructions that can be issued in a given time period by the dependency matrix. Further, cracking the instruction requires that the dependency matrix be overwritten for the second instruction. Additionally, the system must perform extra source-completion compares in order to execute the second instruction, which also increases the time and power required to execute the original instruction.

Therefore, there is a need for a system and/or method for double issuing instructions using a dependency matrix that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A method receives a complex instruction comprising a first portion and a second portion. The method sets a single issue queue slot and allocates an execution unit for the complex instruction, and identifies dependencies in the first and second portions. The method sets a dependency matrix slot and a consumers table slot for the first and section portion. In the event the first portion dependencies have been satisfied, the method issues the first portion and then issues the second portion from the single issue queue slot. In the event the second portion dependencies have not been satisfied, the method places the second portion into a side issue queue. The method issues the second portion when the side issue queue indicates that the second portion is eligible for issue.

In an alternate embodiment, a method receives a complex instruction comprising a first portion and a second portion. The method sets a single issue queue slot and allocates an execution unit for the complex instruction, and identifies dependencies in the first and second portions. The method sets a dependency matrix slot and a consumers table slot for the first and section portion. In the event the first portion dependencies have been satisfied, the method issues the first portion and then forwards the second portion to a side issue queue. The side issue queue indicates that the second portion is eligible for issue, after which the issue queue issues the second portion.

In an alternate embodiment, a method receives a complex instruction comprising a first portion and a second portion. The method sets a single issue queue slot and allocates an execution unit for the complex instruction, and identifies dependencies in the first and second portions. The method forwards the second portion to a side issue queue. The method sets a dependency matrix slot and a consumers table slot for the first and section portion. In the event the first portion dependencies have been satisfied, the method issues the first portion and then issues the second portion from the single issue queue slot, when the side issue queue indicates the second portion is eligible for issue.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
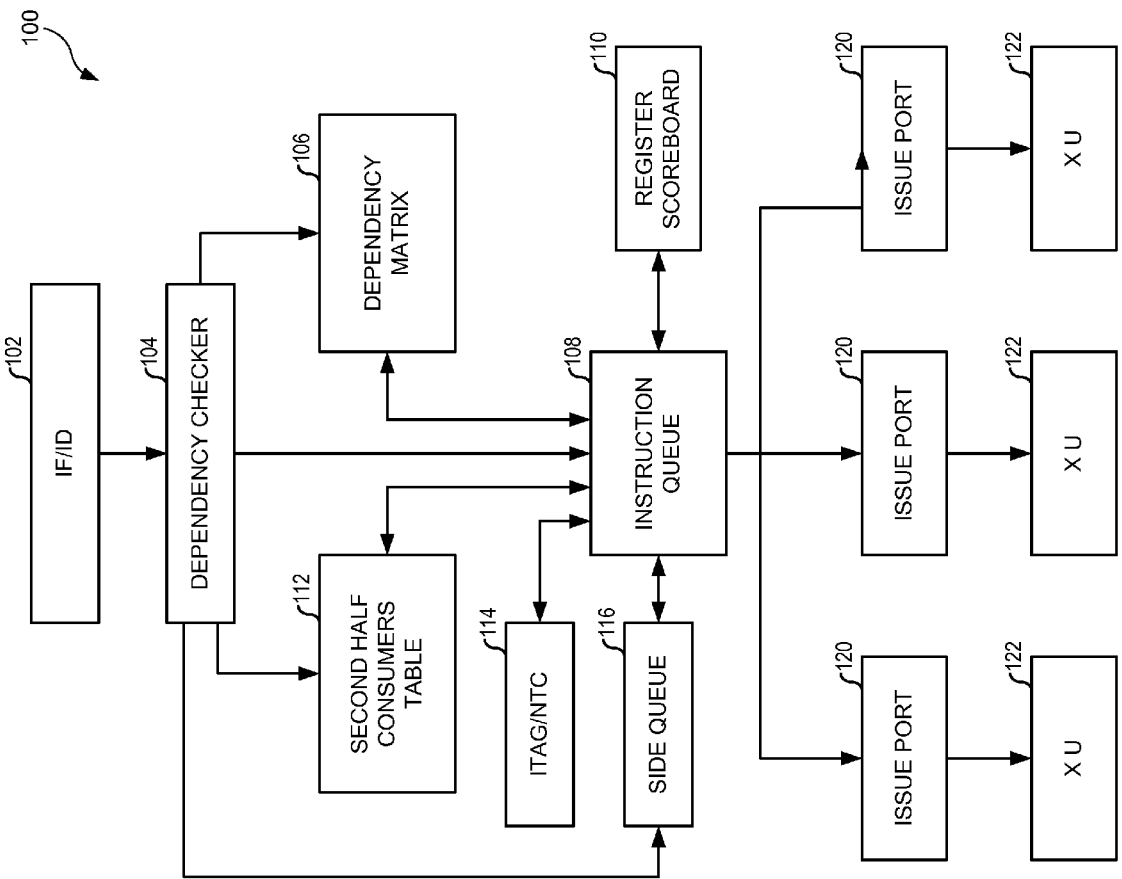
FIG. 1 illustrates a block diagram showing a system for double-issue complex instructions in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for double issuing instructions using a dependency matrix and a side issue queue in accordance with one embodiment of the invention. In the illustrated embodiment, system 100 comprises: an instruction fetch/instruction decode (IF/ID) module 102, a dependency checker 104, a dependency matrix 106, an issue queue 108, a register scoreboard 110, a second half consumers table 112, an instruction tag/next to complete (ITAG/NTC) comparator 114, a side issue queue 116, one or more issue ports 120, and one or more execution units 122.

In the illustrated embodiment, IF/ID module 102 is an otherwise conventional retrieval and decoding module for fetching and decoding instructions. In the illustrated embodiment, dependency checker 104 is an otherwise conventional dependency checker, modified as described below. Generally, dependency checker 104 compares source and destination information among the instructions decoded by IF/ID module 102, to identify dependencies in the instructions, if any. Dependency checker 104 forwards the instruction to issue queue 108. Dependency checker 108 also forwards identified dependency information to dependency matrix 106 and second half consumers table 112, as described in more detail below.

For complex instructions, dependency checker 104 also identifies a first half and a second half of the complex instruction. Generally, in one embodiment, the first half of a complex instruction is that portion of the complex instruction preferred to issue before any other portion of the complex instruction. For example, the first portion can be that portion of the complex instruction that serves to acquire an important resource, or that portion of the complex instruction that improves overall performance when issued first. Dependency checker 104 forwards the first half dependency information to dependency matrix 106, and the second half dependency information to second half consumers table 112.

In the illustrated embodiment, dependency matrix 106 is an otherwise conventional dependency matrix, modified as described below. Generally, dependency matrix 106 tracks identified dependencies and identified first half dependencies, as described below.

In the illustrated embodiment, issue queue 108 is an otherwise conventional issue queue, modified as described below. Generally, issue queue 108 stores instructions prior to issue for execution by a specific execution unit. In the illustrated embodiment, instruction queue 108 issues instructions to an issue port 120 coupled to an execution unit 122. Issue port 120 is an otherwise conventional issue port, and execution unit 122 is an otherwise conventional execution unit. One skilled in the art will understand that execution 122 can be any suitable execution unit, such as a floating point unit (FPU) or fixed point unit (FXU), for example.

In the illustrated embodiment, register scoreboard 110 is an otherwise conventional register scoreboard modified as described below. Generally, register scoreboard 110 tracks source information upon which instructions depend, as described below.

As described above, system 100 includes second half consumers table 112. Generally, second half consumers table 112 tracks and stores second half dependencies information, as described below.

In the illustrated embodiment, ITAG/NTC comparator 114 is an otherwise conventional comparator, modified as described below. Generally, ITAG/NTC comparator compares instruction tag (ITAG) information of an instruction against the ITAG information of the next-to-complete (NTC) instruction.

In the illustrated embodiment, side queue 116 is an otherwise conventional instruction queue, modified as described below. Generally, side queue 116 receives the second of the half instruction and an instruction pointer that points to the instruction location in issue queue 108. In one embodiment, side queue 116 also tracks the dependencies of the second half of the instruction. When the second half sources are ready, side queue 116 marks the second half of the instruction as ready for issue.

In a general exemplary operation in accordance with one embodiment, IF/ID 102 fetches and decodes an instruction, and forwards the instruction to dependency checker 104. Dependency checker 104 identifies complex instructions and, for identified complex instructions, identifies a first half of the complex instruction and a second half of the complex instruction. Dependency checker 104 forwards first half dependency information to dependency matrix 106, forwards second half dependency information to second half consumers table 112, and forwards the instruction to issue queue 108. In one embodiment, dependency checker 104 also identifies dependencies in simple instructions, forwarding dependency information to dependency matrix 106, and forwarding the simple instruction to issue queue 108. In one embodiment, first half dependency information and second half dependency information also indicate that the subject instruction has no dependencies, if applicable.

Dependency matrix 106 assigns the first half dependency information to a slot within dependency matrix 106 based on the issue queue slot, the first half of the instruction, and the first half dependencies. Similarly, the second half consumers table 112 assigns the second half dependency information to a slot within the second half consumers table 112 based on the issue queue slot, the second half of the instruction, and the second half dependencies.

Periodically, whenever issue queue 108 determines which instruction to issue next, issue queue 108 checks dependency matrix 106 to determine whether there are any remaining dependencies. If dependency matrix 106 indicates that there are remaining dependencies, issue queue 108 delays the first half of the instruction for one cycle, and processes the next instruction in the queue after the first half of the instruction. If the first half instruction has no remaining dependencies indicated in dependency matrix 106, and otherwise meets the issue algorithm criteria, issue queue 108 forwards the first half of the instruction, from the issue queue slot, to the appropriate issue port 120 for the target execution unit 122. Issue queue 108 then checks register scoreboard 110 to determine whether the sources upon which the first half of the instruction depends (the "first half sources") are available according to register scoreboard 110. If the first half sources are not available, issue queue 108 cancels ("squashes") execution of the first half of the instruction. If the first half sources are available, issue queue 108 does not squash execution of the first half of the instruction.

Once the first half of the instruction issues, second half consumers table 112 marks the second half of the instruction as eligible for issue. Issue queue 108 selects and issues the second half of the instruction without checking the availability of the sources upon which the second half of the instruction depends (the "second half sources"), as described in more detail below. After the second half of the instruction issues, issue queue 108 checks the availability of the second half sources in register scoreboard 110. If the second half sources are available, then issue queue 108 removes the entire complex instruction, clearing the issue queue 108 slot in which the complex instruction resided. If the second half sources are not available, issue queue 108 squashes the second half instruction issue and marks the second half of the instruction eligible for re-issue at a later time.

When the sources upon which the second half instruction depends (the "second half sources") are available, side queue 116 marks the second half instruction in issue queue 108 as eligible for issue. In one embodiment, issue queue 108 uses an otherwise conventional issue algorithm to select the oldest ready instruction in the issue queue in order to issue the second half instruction once it has been marked ready by side queue 116.

Side queue 116 de-allocates the slot in which the second half instruction is stored once the sources are available and the instruction has been marked in issue queue 108 as ready to issue. In one embodiment, if the second half instruction has been flushed from issue queue 108 then the second half instruction is removed from side queue 116. In one embodiment, the ITAG information stored in side queue 116 is compared by ITAG/NTC comparator 114 against a flush mask to determine if the second half instruction should be removed from side queue 116.

In an alternate embodiment, if the second half instruction has been flushed from issue queue 108, then all entries for the flushed thread in side queue 116 are removed. If an entry in side queue 116 was not flushed from issue queue 108, the corresponding slots in issue queue 108 are marked as available for issue. If the sources for the second half instructions are still not available, issue queue 108 forwards the second half instructions to side queue 116.

In the illustrated embodiment, if side queue 116 is full, then when issue queue 108 squashes second half instructions due to the unavailability of their sources, issue queue 108 marks the instruction as not available for issue until a slot in side queue 116 becomes available.

In an alternate embodiment, issue queue 108 forwards the second half instruction to side queue 116 when the first half instruction issues, without first trying to issue the second half instruction. Issue queue 108 checks register scoreboard 110 for the availability of the sources upon which the second half instruction depends. If the sources are available, side queue 116 marks the second half instruction as ready to issue in issue queue 108.

If the sources are not available, side queue 116 performs as described above. In the illustrated embodiment, if side queue 116 has no remaining slots for new instructions, issue queue 108 will hold issuance of the corresponding first half instruction until a slot is available in side queue 116, at which point system 100 operates as described above.

In an alternate embodiment, dependency checker 104 forwards the second half instruction directly into side queue 116. Side queue 116, then performs as described above. If side queue 116 is full, dependency checker 104 holds the issuance of any new double issue instructions until a slot is available in side queue 116. Alternatively, if side queue 116 is full, dependency checker 104 pushes the second half instruction into side queue 116, and another second half instruction is removed from side queue 116. In one embodiment, the removed instruction is processed in an otherwise conventional manner.

Thus, as described above, system 100 illustrates, at a relatively high level, the system and method for double-issuing instructions using a dependency matrix and a side queue. More specifically, in one embodiment, dependency matrix 106, issue queue 108, consumers table 112, and side queue 116, generally interact as described in FIG. 2.

Figure 2:
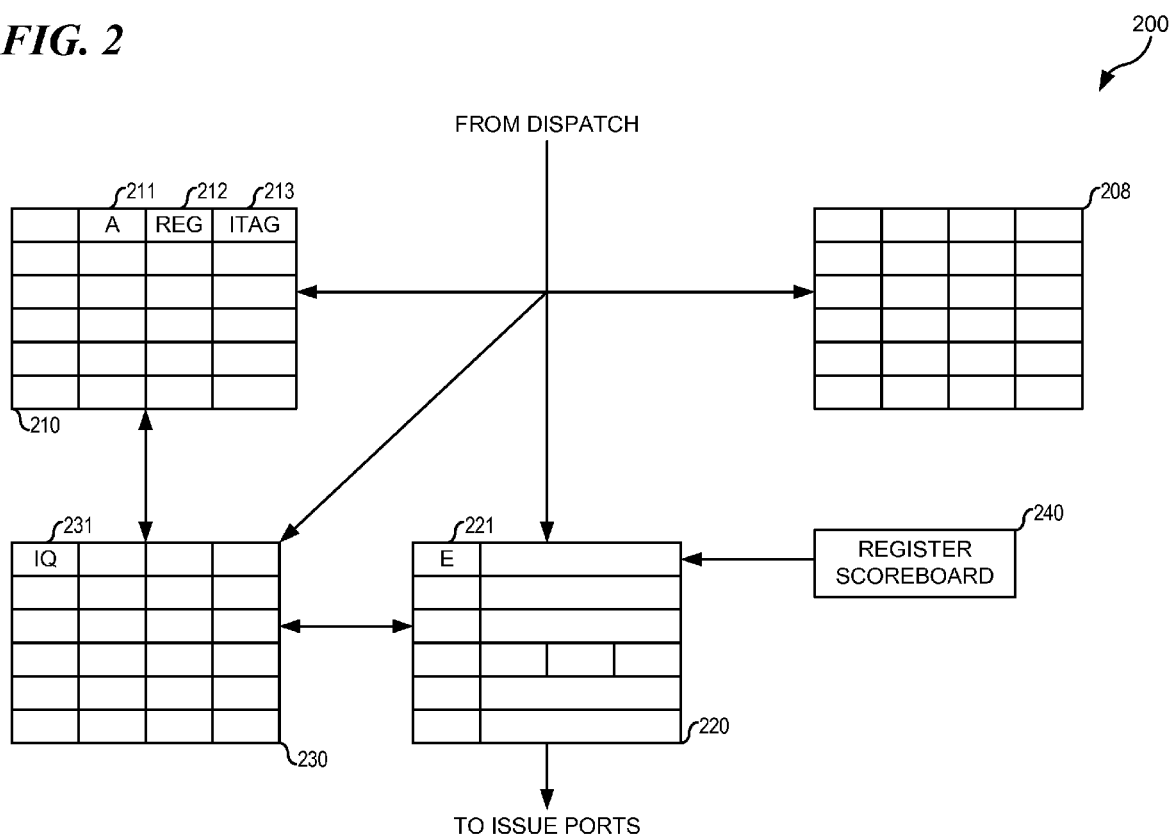
FIG. 2 illustrates a block diagram showing a system for double-issue complex instructions in accordance with a preferred embodiment.
Figure 3:
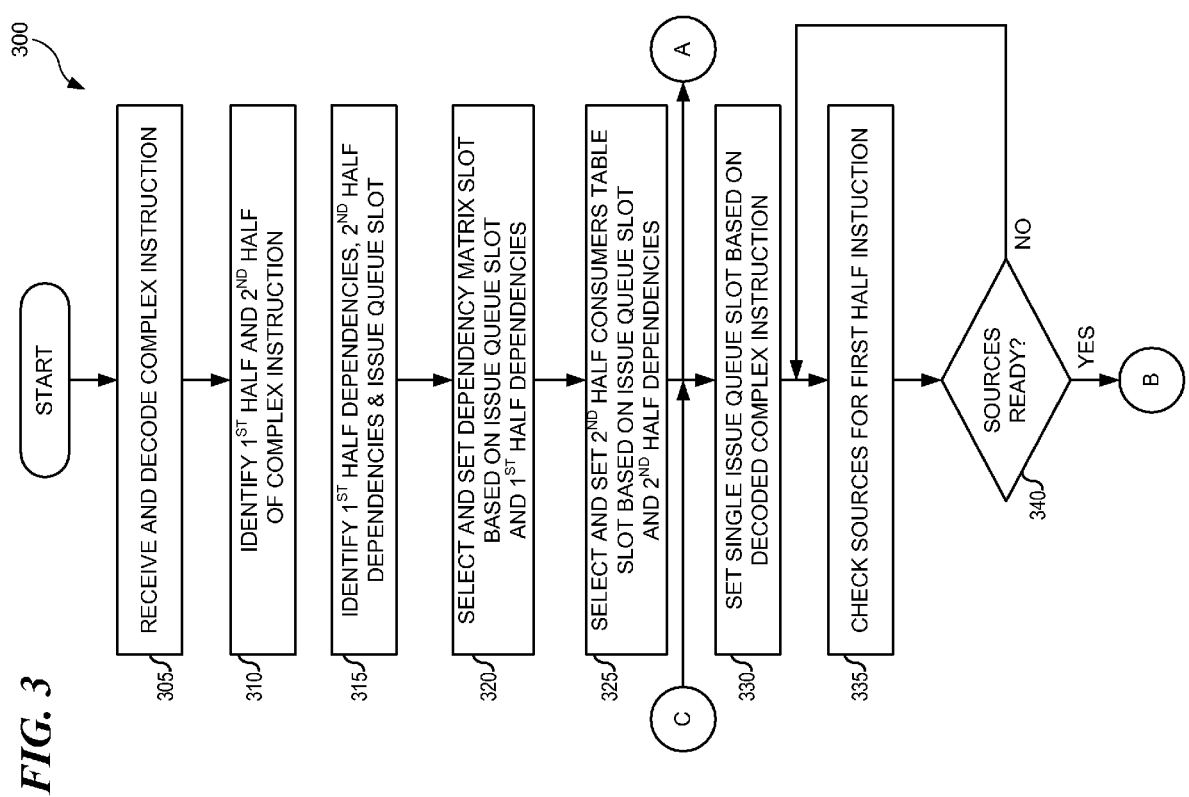
FIG. 3 illustrates a high-level flow diagram depicting logical operational steps of an improved double-issue complex instruction method, which can be implemented in accordance with a preferred embodiment.
Figure 4:
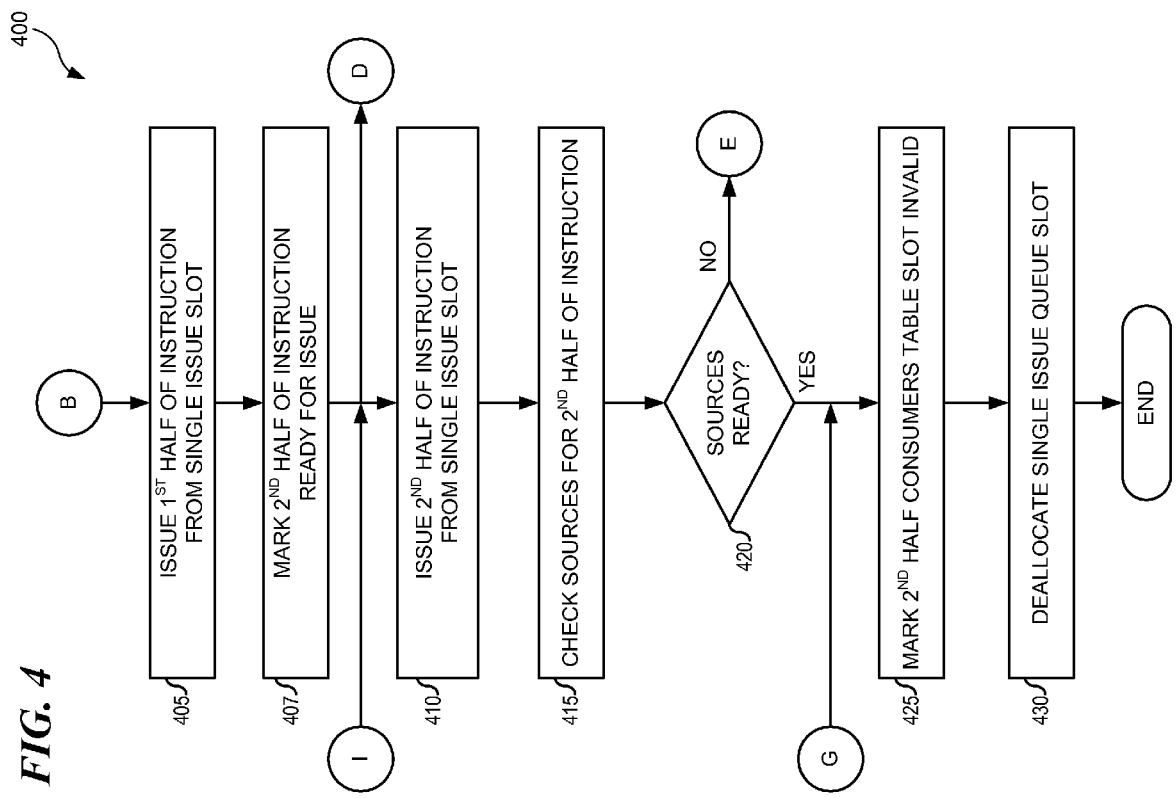
FIG. 4 illustrates a high-level flow diagram depicting logical operational steps of an improved double-issue complex instruction method, which can be implemented in accordance with a preferred embodiment.

FIG. 2 illustrates system 200, in an exemplary embodiment of the present invention. As illustrated, system 200 comprises a dependency matrix 202, a second half consumers table 210, an issue queue 220, a side queue 230, and a register scoreboard 240.

In the illustrated embodiment, dependency matrix 202 is an otherwise conventional dependency matrix, modified as described below. Dependency matrix 202 comprises a grid of intersecting rows and columns. Generally, each row corresponds to an associated slot of issue queue 220. Similarly, each column corresponds to an associated slot of issue queue 220. A bit in the location of the intersection of any particular row with another column indicates that the instruction assigned to that particular slot within issue queue 220 is dependent upon the instruction in issue queue 220 corresponding to the particular column. For example, the instruction at slot four of issue queue 220 is dependent upon the instructions at slots three and seven.

In the illustrated embodiment, second half consumers table 210 also comprises a series of rows and columns. Generally, each row corresponds to an associated slot of issue queue 220. Column A 211 corresponds to the eligibility of the second half of the instruction stored in that row. In one embodiment, column A 211 is a "ready" bit. Column REG 212 corresponds to the register upon which the second half of the instruction depends. Column ITAG 213 corresponds to the ITAG information of the first half of the instruction, which is sent with the second half of the instruction by dispatch.

In the illustrated embodiment, issue queue 220 is an otherwise conventional issue queue, modified as described below. In the illustrated embodiment, issue queue 220 comprises a series of six slots for ease of illustration. One skilled in the art will understand that an issue queue can be comprised of any number of slots, and that typical issue queues contain slots in multiples of eight. Generally, in one embodiment, the slots of issue queue 220 are numbered positions in which the instructions sent by dispatch are stored. In the illustrated embodiment, Column E 221 corresponds to the eligibility information of the instruction stored in the particular slot of issue queue 220. In one embodiment, Column E 221 is a "ready bit".

In the illustrated embodiment, side queue 230 is an otherwise conventional instruction queue, modified as described below. In the illustrated embodiment, side queue 230 comprises a series of six slots for ease of illustration. One skilled in the art will understand that a side queue can be comprised of any number of slots depending on the preference of the designer. Column IQ 231 corresponds to the instruction pointer to the second half of the instruction in issue queue 220.

In the illustrated embodiment, register scoreboard 203 is an otherwise conventional register scoreboard. Generally, register scoreboard 230 comprises a series of entries that correspond to the registers used by the instructions. In one embodiment, each entry in register scoreboard 230 indicates whether the corresponding register's data is ready to be read/used by other instructions.

In the illustrated embodiment, dispatch forwards the first half dependency information to dependency matrix 202. Dependency matrix 202 assigns the first half of the instruction to the location corresponding to the location of the complex instruction in issue queue 220.

Generally, at dispatch dependency matrix 202 sets the bits indicating which resource to monitor for the first half of the instruction, according to the first half of the instruction RAW dependencies. In one embodiment, when a resource becomes available, dependency matrix 202 sets the bit indicating that dependency to zero. When all of the bits indicating dependencies of the first half of the instruction have been set to zero, the first half instruction is ready to issue.

In the illustrated embodiment, dispatch forwards a complex instruction comprising a first portion and a second portion to issue queue 220. Issue queue 220 processes the first half of the instruction in an otherwise conventional manner. When the first half of the instruction issues, issue queue 220 issues the second half of the instruction.

In the illustrated embodiment, dispatch forwards the second half dependency information, the ITAG information of the first half of the instruction, and the eligibility information of the second half of the instruction to second half consumers table 210. Generally, the eligibility of the second half of the instruction depends on the issuance of the first half of the instruction. Therefore, the eligibility bit of the second half of the instruction is initially '0' at dispatch. When the first half of the instruction issues, second half consumers table 210 sets the eligibility bit, indicating that the second half of the instruction is now eligible for issue.

When second half consumers table 210 sets the eligibility bit of column A 211, issue queue 220 speculatively issues the second half of the instruction. The system then checks column REG 212 to determine what register the second half information is dependent upon. The system then checks register scoreboard 240 to see if the sources upon which the second half of the instruction depends (the "second half sources") are available. If the second half sources are available, issue queue 220 de-allocates and the associated slot in issue queue 220.

In the illustrated embodiment, if the second half sources are not available, system 200 cancels ("squashes") the second half of the instruction and forwards the second half of the instruction and the instruction pointer of the appropriate slot of issue queue 220 to side queue 230. In an alternate embodiment, system 200 does not include a second half consumers table 210 and instead, at dispatch, forwards the second half of the instruction and the instruction pointer to side queue 230.

Side queue 230 tracks the dependency information of the second half of the instruction in the same manner as issue queue 220, described above. When side queue 230 determines that the second half sources are available, side queue 230 marks the second half of the instruction as ready to issue. Issue queue 220 then issues the second half of the instruction. Side queue 230 de-allocates the slot in which the second half of the instruction had occupied in side queue 230.

In an alternate embodiment, issue queue 220 forwards the second half of the instruction to side queue 230 when the first half instruction issues, without first trying to issue the second half of the instruction. In an alternate embodiment, dispatch places the second half of the instruction and associated information directly into side queue 230, as dispatch places the first half of the instruction in dependency matrix 202, as described above. When the second half sources become available, side queue 230 marks the second half of the instruction as ready to issue in issue queue 220. While the sources are not available, side queue 230 performs as described above.

FIGS. 3 through 10 describe a general exemplary sequence of operations, in accordance with the embodiments described above. Specifically, FIG. 3, FIG. 4, FIG. 5, FIG. 5a FIG. 6, FIG. 7, FIG. 8, FIG. 9 and FIG. 10 illustrate high-level flow chart 300, 400, 500, 501, 600, 700, 800, 900, and 1000 respectively. These flow charts depict logical operation steps performed by, for example, system 100 of FIG. 1, which may be implemented in accordance with a preferred embodiment.

As indicated at block 305, the process begins, wherein system 100 fetches and decodes a complex instruction. For example, IF/ID module 102 fetches and decodes a complex instruction. One skilled in the art will understand that while the steps described herein are described with respect to a complex instruction; system 100 can also process simple instructions. Next, as indicated at block 310, system 100 identifies a first and second half of a complex instruction. For example, dependency checker 104 identifies a first and second half of a complex instruction.

Next, as indicated at block 315, system 100 identifies dependencies in the first half of the instruction, dependencies in the second half of the instruction, and the issue queue slot, and forwards the instruction to the issue queue. For example, dependency checker 104 identifies dependencies in the first half of the instruction, dependencies in the second half of the instruction, identifies the issue queue slot, and forwards the instruction to issue queue 108.

Next, as indicated at block 320, system 100 selects and sets a dependency matrix slot based on the issue queue slot and the first half dependencies. For example, system 100 can be configured with one or more components of system 200 of FIG. 2. In one embodiment, dependency matrix 202 receives the first half dependency information, and the associated issue queue slot position from dependency checker 104 of system

100. Dependency matrix 202 then assigns the dependency information to the row associated with the slot in issue queue 220.

Next, as indicated at block 325, system 100 selects and sets the second half consumers table based on the issue queue slot for the instruction. System 100 also forwards second half dependency information to the second half consumers table. For example, system 100 can be configured with one or more components of system 200 of FIG. 2. In one embodiment, second half consumers table 210 receives the second half dependency information, the ITAG information of the first half of the instruction, the eligibility information, and the associated issue queue slot position from dependency checker 104 of system 100. Based on the issue queue slot position, second half consumers table 210 assigns the second half dependency information, the ITAG information of the first half of the instruction, and the eligibility information to the corresponding slot of second half consumers table 210.

In one embodiment, system 100 next proceeds to Marker "A" of FIG. 8, described below. In an alternate embodiment, system 100 continues to block 330.

Next, as indicated at block 330, system 100 sets a single issue queue slot based on the complex instruction decoded by IF/ID module. For example, issue queue 108 receives the instruction and the identity of the issue slot from dependency checker 104. Based on the identity of the issue slot, issue queue 108 assigns the instruction to the appropriate slot.

One skilled in the art will understand that the steps of the methods described herein can be performed in many particular orders. As such, for example, the order in which system 100 performs the steps described in blocks 320, 325, and 330 is not fixed, and the steps can be configured to perform in any order. In one embodiment, the steps of block 320, 325, and 330 are performed in the order in which they are presently described. In another embodiment, the steps of block 320, 325, and 330 are performed in reverse order. Likewise, system 100 can forward the second half instruction to the side queue at any point after the processes described at block 315.

Next, as indicated at block 335, system 100 checks the availability of the sources for the first half of the instruction. For example, system 100 can be configured with one or more components of system 200 of FIG. 2. In one embodiment, issue queue 108 checks dependency matrix 202, in an otherwise conventional manner, for any remaining dependencies. In another embodiment, issue queue 108 uses, in an otherwise conventional manner, both dependency matrix 202 and register scoreboard 240 to check for any remaining dependencies.

Next, as indicated at decisional block 340, system 100 determines if the sources for the first half instruction (the "first half sources") are available. If at decisional block 340 the first half sources are not available, the process continues along the NO branch, returning to block 335. If at decisional block 340 the first half sources are available, the process continues along the YES branch to Marker "B" of FIG. 4.

From Marker "B", the process continues to block 405. Next, as indicated at block 405, system 100 issues the first half of the instruction from the single issue slot. For example, issue queue 108 issues the first half of the instruction from the single issue slot.

Next, as indicated at block 407, system 100 marks the second half of the instruction as eligible for issue. For example, system 100 can be configured to include one or more components of system 200 of FIG. 2. In one embodiment, issue queue 108 marks the second half of the instruction in the single issue slot for issue and second half consumers table 210 changes the bit of column A 211 to indicate that the second half of the instruction is eligible for issue.

In one embodiment, the process continues to Marker "D" of FIG. 7, described below. In an alternate embodiment, the process continues to block 410.

Next, as indicated at block 410, system 100 issues the second half of the instruction from the single issue slot. For example, issue queue 108 issues the second half of the instruction. Next, as indicated at block 415, system 100 checks the availability of the second half sources. For example, in one embodiment, issue queue 108 checks second half consumers table 112 for the availability of the second half sources. In an alternate embodiment, issue queue 108 checks register scoreboard 110 for the availability of the second half sources.

Next, as indicated at decisional block 420, system 100 determines whether the second half sources are ready. If at decisional block 420 the second half sources are not ready, the process continues along the NO branch to Marker "E" of FIG. 5, described below. If at decisional block 420 the second half sources are ready, the process continues along the YES branch to block 425.

Next, as indicated at block 425, system 100 marks the second half consumers table slot invalid. For example, system 100 can be configured to include one or more components of system 200 of FIG. 2. In one embodiment, second half consumers table 210 invalidates the slot occupied by the second half dependency information, the eligibility information, and the ITAG information of the first half of instruction.

Next, as indicated at block 430, system 100 de-allocates the single issue slot in the issue queue and the process ends. In one embodiment, issue queue 108 de-allocates the single issue slot where the instruction was stored.

Figure 5:
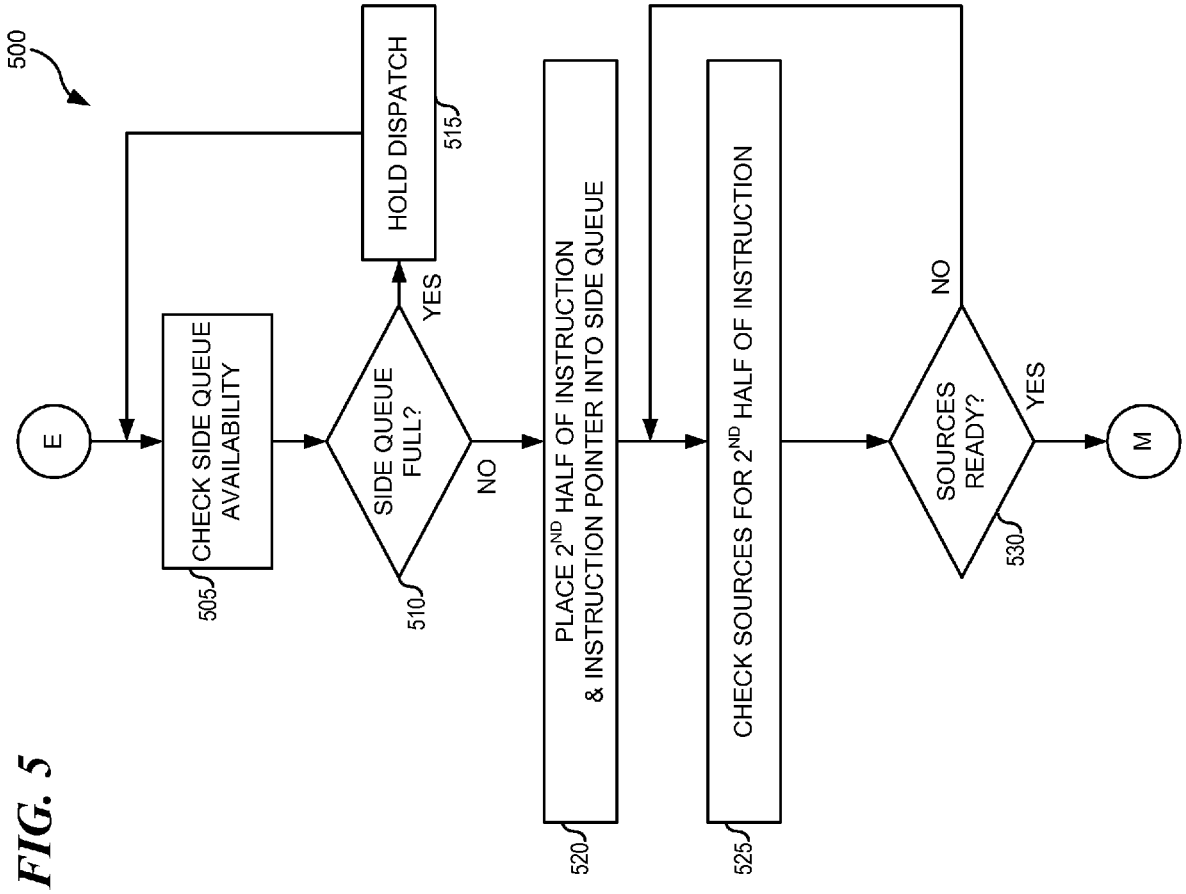
FIGS. 5 and 5a illustrate a high-level flow diagram depicting logical operational steps of an improved double-issue complex instruction method, which can be implemented in accordance with a preferred embodiment.
Figure 5A:
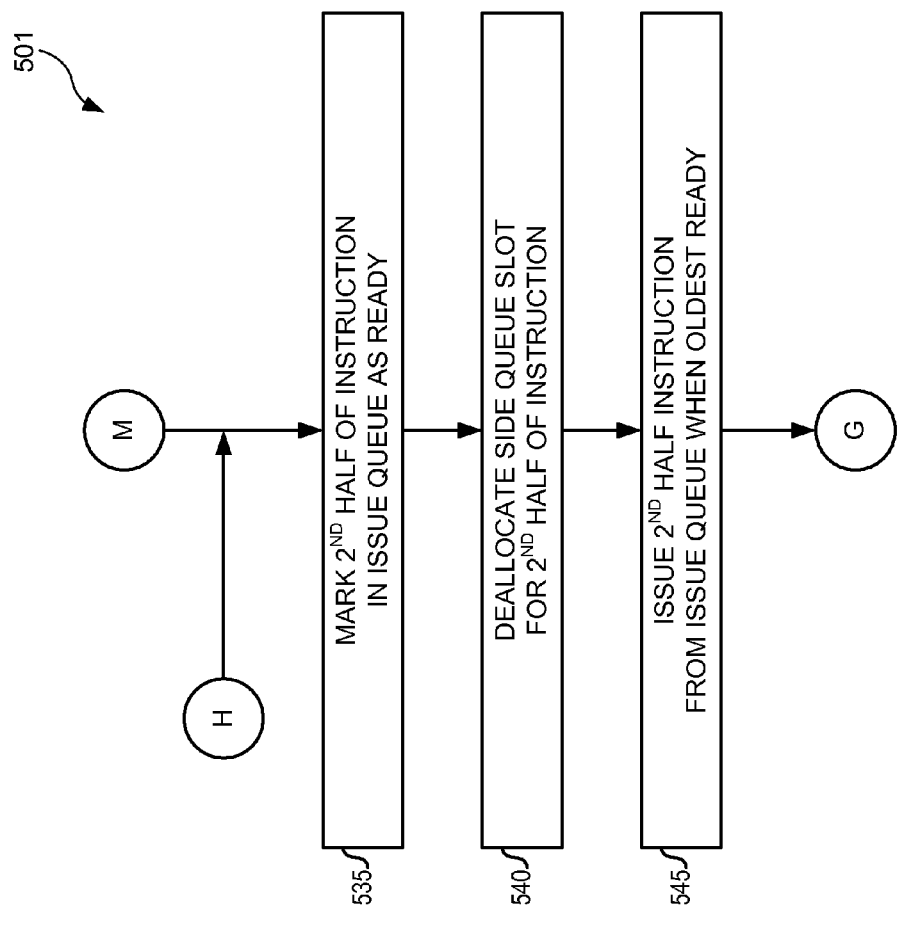
Figure 6:
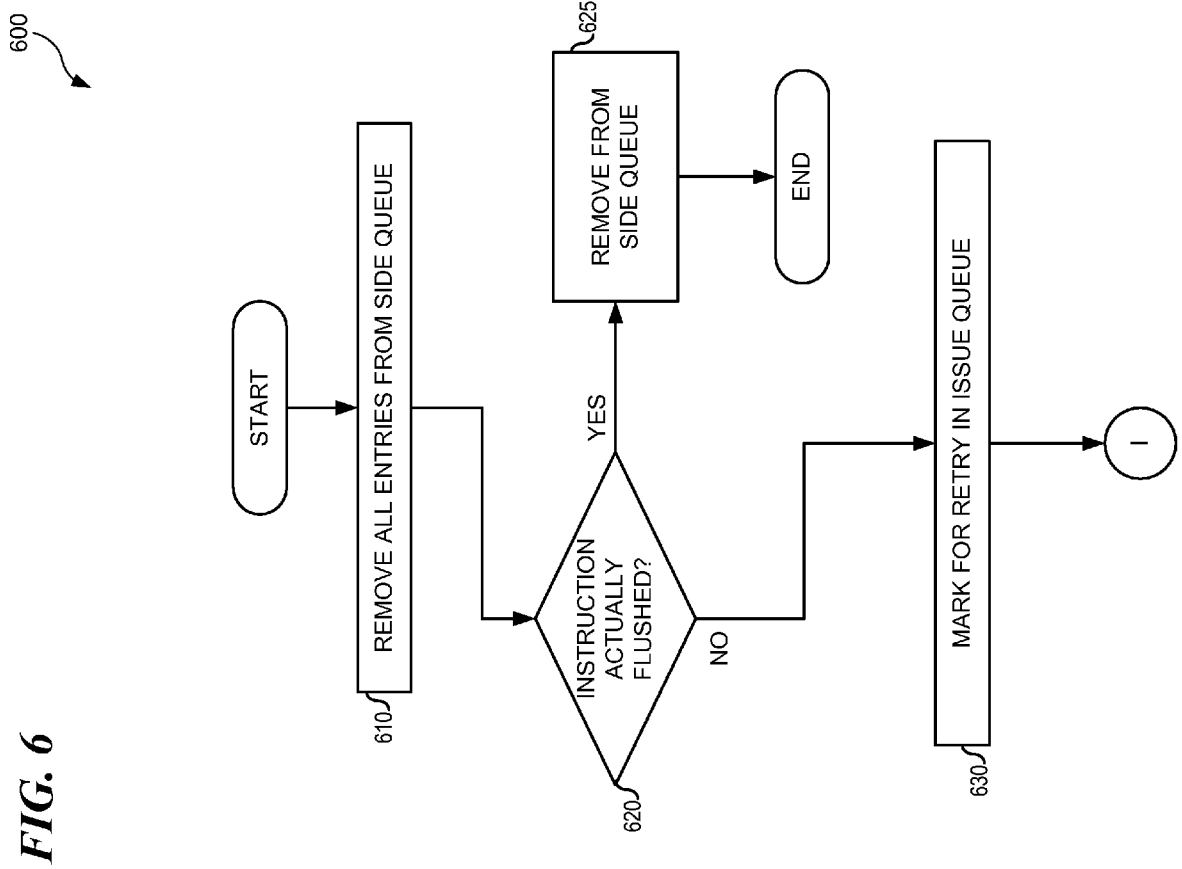
FIG. 6 illustrates a high-level flow diagram depicting logical operational steps of an improved double-issue complex instruction method, which can be implemented in accordance with a preferred embodiment.

As described above, if at decisional block 420 the second half sources are not available, the process continues along the NO branch to Marker "E" of FIG. 5. The process continues from Marker "E" to block 505. Next, as indicated at block 505, system 100 checks side queue availability. For example, system 100 checks side queue 116 for an available slot. Next, as indicated at decisional block 510, system 100 determines whether the side queue is full. If at decisional block 510 the side queue is full, the process continues along the YES branch to block 515. Next, as indicated at block 515, system 100 holds dispatch and rechecks the side queue until a slot is available.

If at decisional block 510 the side queue is not full, the process continues along the NO branch to block 520. Next, as indicated at block 520, system 100 places the second half of the instruction and an instruction pointer in the side queue. For example, system 100 forwards to side queue 116 the second half of the instruction and an instruction pointer, which points to the location of the complex instruction in issue queue 108.

Next, as indicated at block 525, system 100 checks the availability of the second half sources. For example, side queue 116 checks second half consumers table 112 for the second half source availability. Next, as indicated at decisional block 530, system 100 determines whether the second half sources are available. If at decisional block 530 the second half sources are not available, the process continues along the NO branch, returning to block 525. If at decisional block 530 the second half sources are available, the process continues along the YES branch to Marker "M" of FIG. 5a.

The process continues from Marker "M" to block 535. Next, as indicated at block 535, system 100 marks the second half of the instruction as ready to issue in the issue queue. For example, side queue 116 uses the instruction pointer information stored in side queue 116 to mark the second half of the complex instruction in issue queue 108 as ready to issue.

Next, as indicated at block 540, system 100 de-allocates the side queue slot of the second half of the instruction. For example, side queue 116 de-allocates the slot for the second half of the instruction. Next, as indicated at block 555, system 100 issues the second half of the instruction from the issue queue when the second half of the instruction is the oldest instruction ready to issue. The process continues to Marker "G", returning to block 425, as described above.

Periodically, system 100 checks the issue queue to determine whether the second half of the instruction has been flushed. If the second half instruction has been flushed from the issue queue, in one embodiment, system 100 proceeds as described in FIG. 6. The process begins at block 610.

As indicated at block 610, the system removes entries from the flushed thread from the side queue. For example, system 100 removes all instructions from the same flushed thread from side queue 116. One skilled in the art will understand that the second half of the instruction can belong to a thread, which, when flushed, may not actually clear every thread entry in the issue queue.

Next, as indicated at decisional block 620, system 100 checks the issue queue to determine whether the removed instructions have actually been flushed. If at decisional block 620 the removed instructions have actually been flushed, the process continues along the YES branch to block 625. As indicated at block 625, the system removes any remaining indicia of the second half of the instruction in the side queue, by resetting valid bits, for example, and the process ends.

If at decisional block 620 the removed instructions have not actually been flushed from the issue queue, the process continues along the NO branch to block 630. Next, as indicated at block 630, system 100 marks the second half of the instruction as available for retry in the issue queue. The process continues to Marker "I", returning to block 410 of FIG. 4, described above.

Figure 7:
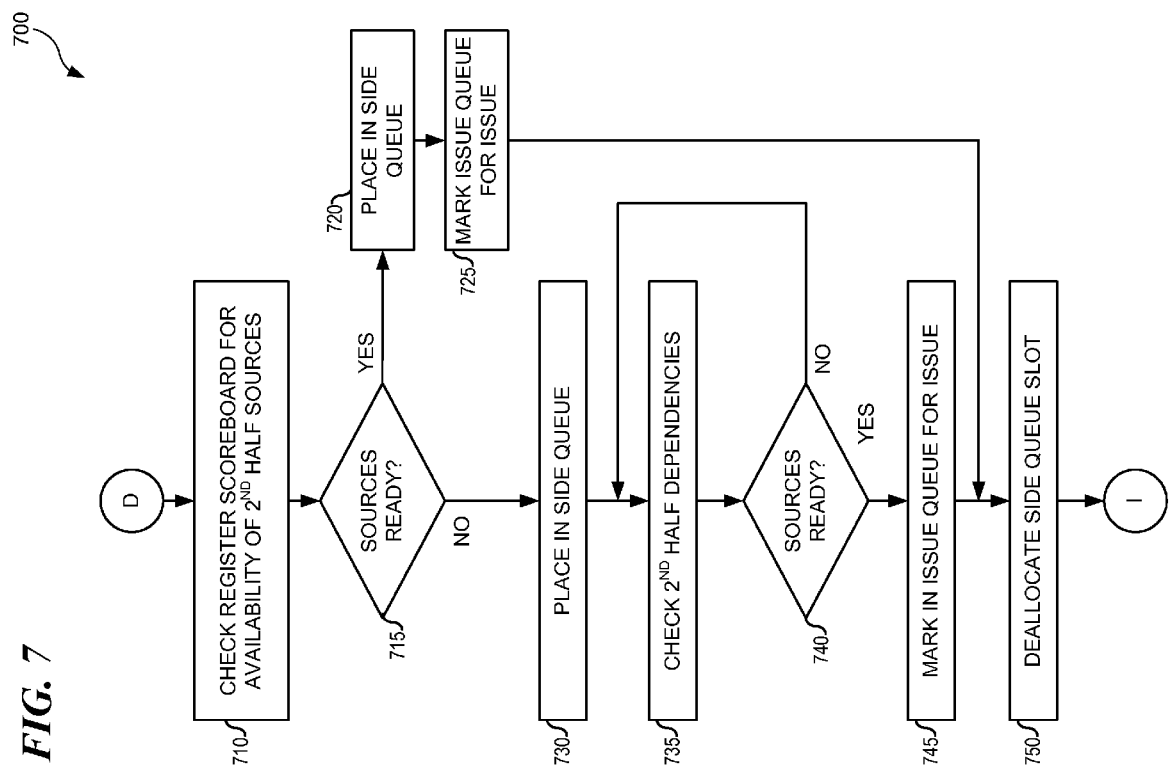
FIG. 7 illustrates a high-level flow diagram depicting logical operational steps of an improved double-issue complex instruction method, which can be implemented in accordance with a preferred embodiment.

As described above, in one embodiment, the process continues from block 407 to Marker "D" of FIG. 7. From Marker "D" the process continues to block 710. Next, as indicated at block 710, system 100 checks the register scoreboard for the availability of the second half sources. For example, issue queue 108 checks register scoreboard 110 for the availability of the second half sources. Next, as indicated at decisional block 715, system 100 determine whether the second half sources are ready. If at decisional block 715 the second half sources are ready, the process continues along the YES branch to block 720. Next, as indicated at block 720, system 100 places the second half of the instruction in the side queue. Next, as indicated at block 725, system 100 marks the second half of the instruction as eligible for issue, and the process continues to block 750, described below.

If at decisional block 715 the second half sources are not ready, the process continues along the NO branch to block 730. Next, as indicated at block 730, system 100 places the second half of the instruction in the side queue. Next, as indicated at block 735, system 100 checks the second half dependencies. For example, in one embodiment, side queue 116 checks second half consumers table 112 to identify the second half sources. Side queue 116 then checks register scoreboard 110 for the availability of those sources. Next, as indicated at decisional block 740, system 100 determines whether the second half sources are available. If at decisional block 740 the second half sources are not available, the process continues along the NO block, returning to block 735.

If at decisional block 740 the second half sources are available, the process continues along the YES branch to block 745. Next, as indicated at block 745, system 100 marks the second half of the instruction in the issue queue as available for issue. For example, in one embodiment, side queue 116 checks the instruction pointer associated with the second half instruction and marks the appropriate instruction in issue queue 108 as ready to issue.

Next, as indicated at block 750, system 100 de-allocates the side queue slot the second half of the instruction occupies. For example, in one embodiment, side queue 116 de-allocates the slot in side queue 116 the second half of the instruction occupies. The process continues to Marker "I" of FIG. 4, returning to block 410, described above.

Figure 8:
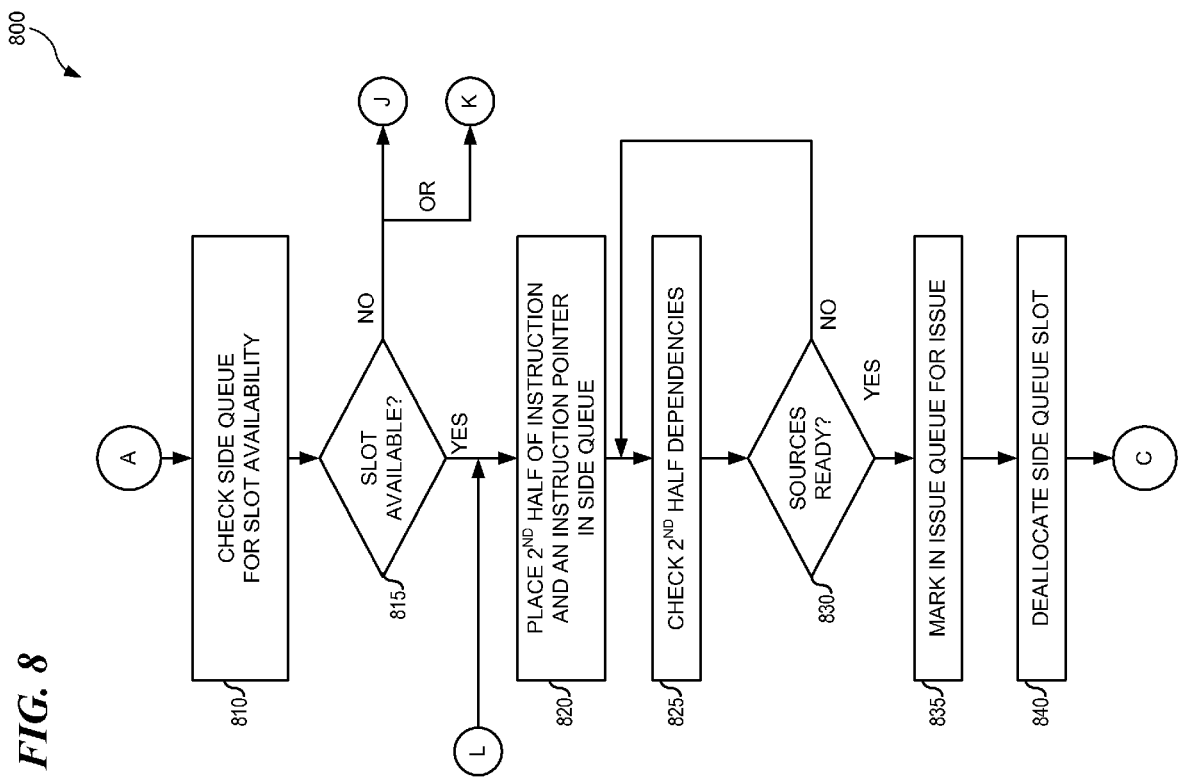
FIG. 8 illustrates a high-level flow diagram depicting logical operational steps of an improved double-issue complex instruction method, which can be implemented in accordance with a preferred embodiment.
Figure 9:
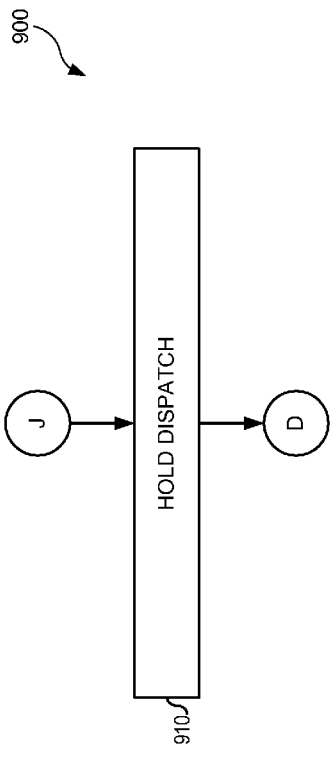
FIG. 9 illustrates a high-level flow diagram depicting logical operational steps of an improved double-issue complex instruction method, which can be implemented in accordance with a preferred embodiment.
Figure 10:
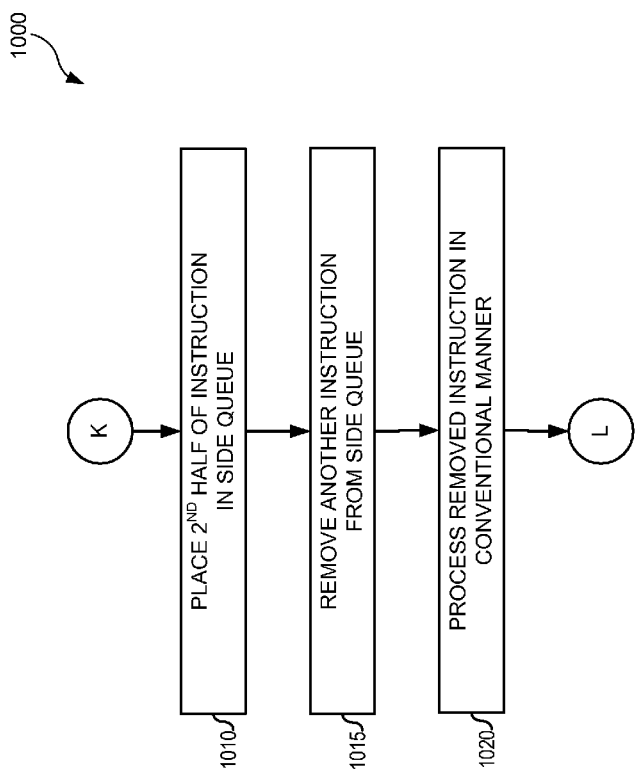
FIG. 10 illustrates a high-level flow diagram depicting logical operational steps of an improved double-issue complex instruction method, which can be implemented in accordance with a preferred embodiment.

As described above, in one embodiment, the process continues from block 325 to Marker "A" of FIG. 8. The process continues from Marker "A" to block 810. As indicated at block 810, system 100 checks the side queue for an available slot. For example, dependency checker 104 checks side queue 116 for an available slot. Next, as indicated at decisional block 815, system 100 determines whether there is an available side queue slot.

If at decisional block 815 there is an available side queue slot, the process continues along the YES branch to block 820. Next, as indicated at block 820, system 100 forwards to the side queue the second half of the instruction and an instruction pointer, which points to the slot in which the complex instruction resides in the issue queue. For example, dependency checker 104 forwards the second half instruction and an instruction pointer to side queue 116. Next, as indicated at block 825, system 100 checks the dependencies of the second half instruction. For example, side queue 116 checks second half consumers table 112 for the second half sources.

Next, as indicated at decisional block 830, system 100 determines whether the second half sources are ready. If at decisional block 830 the second half sources are not ready, the process continues along the NO branch, returning to block 825. If at decisional block 830 the second half sources are ready, the process continues along the YES branch to block 835. Next, as indicated at block 835, system 100 marks the second half of the instruction in the issue queue as ready for issue.

Next, as indicated at block 840, system 100 de-allocates the side queue slot occupied by the second half of the instruction. For example, side queue 116 de-allocates the slot occupied by the second half of instruction. Next, the process continues to Marker "C" of FIG. 3, returning to block 325.

If at decisional block 815 there is no available side queue slot, the process continues along the NO branch. In one embodiment, the process continues along the NO branch to Marker "J" of FIG. 9. In an alternate embodiment, the process continues along the NO branch to Marker "K" of FIG. 10.

The process continues from Marker "J" to block 910. Next, as indicated at block 910, system 100 holds dispatch of the complex instruction. For example, if there are no available slots in side queue 116, IF/ID module 102 will hold any subsequent double issue instructions. Next, the process continues to Marker "D" of FIG. 7, returning to block 710.

The process continues from Marker "K" to block 1010. Next, as indicated at block 1010, system 100 places the second half of the instruction into the side queue, as indicated at block 1010. For example, dependency checker 104 places the second half of the instruction into side queue 116. Next, as indicated at block 1015, system 100 removes another instruction from the side queue. For example, in one embodiment side queue 116 removes another instruction from side queue 116 when dependency checker 104 pushes the second half instruction into side queue 116. One skilled in the art will understand that system 100 can remove an instruction from side queue 116 prior to placing the second half of the instruction into the slot vacated by the removed instruction.

Next, as indicated at block 1020, system 100 processes the removed instruction in an otherwise conventional manner. The process continues to Marker "L" of FIG. 8, returning to block 820, and proceeds as described above.

Accordingly, the disclosed embodiments provide numerous advantages over other methods and systems. For example, the disclosed embodiments allow for a system to issue the second half of an instruction as a double issue instruction as soon as the second half sources are available, which improves performance over prior art systems.

The embodiments disclosed herein also improve performance in that instructions that depend on the second half of a complex instruction can execute earlier than in prior art systems. Specifically, because the second half of the complex instruction completes earlier, the resources produced by the complex instruction (or used by the complex instruction) are available to subsequent instructions sooner than in prior art systems.

The disclosed embodiments also help reduce power consumption. For example some systems employing dependency matrices are prone to increased power consumption arising from the mis-speculation during the issue of the second half of a complex instruction. As the disclosed embodiments help reduce the impact of mis-speculation, including reducing mis-speculation itself, the system uses less power as compared to conventional systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method, comprising:
receiving a complex instruction comprising a first portion and a second portion;
setting an issue queue slot for the complex instruction;
allocating an execution unit for the execution of the complex instruction;
identifying first portion dependencies in the first portion;
identifying second portion dependencies in the second portion;
setting a dependency matrix slot based on the issue queue slot, the second portion, and the second portion dependencies;
determining whether the first portion dependencies have been satisfied, and in the event the first portion dependencies have been satisfied, issuing the first portion from the issue queue slot;
issuing the second portion from a side queue;
setting a consumers table slot based on the issue queue slot, the second portion, and the second portion dependencies;
issuing the second portion from the issue queue slot;
determining in a first test whether the second portion dependencies have been satisfied;
in the event the second portion dependencies have not been satisfied, forwarding the second portion to a side queue;
determining in a second test whether the second portion dependencies have been satisfied; and
in the event the second portion dependencies have not been satisfied, waiting until the second portion dependencies have been satisfied.

2. The method of claim 1, further comprising, in the event the second portion dependencies have been satisfied:
marking the second portion as ready for issue;
issuing the second portion when it is the oldest ready instruction; and
de-allocating the side queue slot.

3. The method of claim 2, further comprising, in the event the second portion has been flushed from the issue queue:
comparing the ITAG of the second portion against a flush mask; and
removing the second portion from the side queue.

4. The method of claim 2, further comprising, in the event the second portion has been flushed from the issue queue:
removing all entries of the complex instruction from the side queue;
marking unflushed side queue entries as available for issue;
setting a consumers table slot based on the issue queue slot, the second portion, and the second portion dependencies;
issuing the second portion from the issue queue slot;
determining in a first test whether the second portion dependencies have been satisfied;
in the event the second portion dependencies have not been satisfied, forwarding the second portion to a side queue;
determining in a second test whether the second portion dependencies have been satisfied; and
in the event the second portion dependencies have not been satisfied, waiting until the second portion dependencies have been satisfied.

5. The method of claim 4, further comprising, in the event the second portion dependencies have been satisfied:
marking the second portion as ready for issue;
issuing the second portion when it is the oldest ready instruction; and
de-allocating the side queue slot.

6. A method, comprising:
receiving a complex instruction comprising a first portion and a second portion;
setting an issue queue slot for the complex instruction;
allocating an execution unit for the execution of the complex instruction;
identifying first portion dependencies in the first portion;
identifying second portion dependencies in the second portion;
forwarding the second portion to a side queue;

setting a dependency matrix slot based on the issue queue
slot, the second portion, and the second portion dependencies;
determining whether the first portion dependencies have
been satisfied, and in the even the first portion dependencies have been satisfied, issuing the first portion from
the issue queue slot;
determining whether the second portion dependencies
have been satisfied;
in the event the second portion dependencies have not been
satisfied, waiting until the second portion dependencies
have been satisfied; and
in the event the second portion dependencies are satisfied:
marking the second portion as ready for issue;
issuing the second portion when it is the oldest ready
instruction; and
de-allocating the side queue slot.

7. The method of claim 6, further comprising, wherein in the event the side queue is full, holding a subsequent double issue instruction at dispatch.

8. The method of claim 6, further comprising, wherein the side queue is full:
pushing the second portion into the side queue;
removing an instruction from the side queue; and
processing the removed instruction.

9. A computer program product for double issue complex instructions, the computer program product comprising:
a non-transitory computer useable storage medium having
computer useable program code embodied therewith,
the computer useable program code comprising:
computer usable program code configured to receive a
complex instruction comprising a first portion and a
second portion;
computer usable program code configured to set an issue
queue slot for the complex instruction;
computer usable program code configured to allocate an
execution unit for the execution of the complex instruction;
computer usable program code configured to identify first
portion dependencies in the first portion;
computer usable program code configured to identify second portion dependencies in the second portion;
computer usable program code configured to set a dependency matrix slot based on the issue queue slot, the
second portion, and the second portion dependencies;
computer usable program code configured to determine
whether the first portion dependencies have been satisfied, and to issue the first portion from the issue queue
slot; and
computer usable program code configured to issue the
second portion from a side queue wherein the size queue
is different from the issue queue.

10. The computer program product of claim 9, further comprising:
computer usable program code configured to set a consumers table slot based on the issue queue slot, the second
portion, and the second portion dependencies;
computer usable program code configured to issue the
second portion from the issue queue slot;
computer usable program code configured to determine in
a first test whether the second portion dependencies have
been satisfied;
computer usable program code configured to, in the event
the second portion dependencies have not been satisfied,
forward the second portion to a side queue;
computer usable program code configured to determine in
a second test whether the second portion dependencies
have been satisfied;
computer usable program code configured to, in the event
the second portion dependencies have not been satisfied,
waiting until the second portion dependencies have been
satisfied;
computer usable program code configured to, in the event
the second portion dependencies have been satisfied,
mark the second portion as ready for issue;
computer usable program code configured to issue the
second portion when it is the oldest ready instruction;
and
computer usable program code configured to de-allocate
the side queue slot.

11. The computer program product of claim 10, further comprising:
computer usable program code configured to, in the event
the second portion has been flushed from the issue
queue:
compare the ITAG of the second portion against a flush
mask; and
remove the second half instruction from the side queue.

12. The computer program product of claim 10, further comprising:
computer usable program code configured to, in the event
the second portion has been flushed from the issue
queue:
remove all entries from the side queue;
mark unflushed side queue entries for issue;
set a consumers table slot based on the issue queue slot,
the second portion, and the second portion dependencies;
issue the second portion from the issue queue slot;
determine in a first test whether the second portion
dependencies have been satisfied;
in the event the second portion dependencies have not
been satisfied, forward the second portion to a side
queue;
determine in a second test whether the second portion
dependencies have been satisfied;
in the event the second portion dependencies have not
been satisfied, wait until the second portion dependencies have been satisfied;
in the event the second portion dependencies have been
satisfied, mark the second portion as ready for issue;
issue the second portion when it is the oldest ready
instruction; and
de-allocate the side queue slot.

13. The computer program product of claim 9, further comprising:
computer usable program code configured to forward the
second portion to a side queue;
computer usable program code configured to determine
whether the second portion dependencies have been satisfied;
computer usable program code configured to, in the event
the second portion dependencies have not been satisfied,
wait until the second portion dependencies have been
satisfied;
computer usable program code configured to, in the event
the second portion dependencies have been satisfied,
mark the second portion as ready for issue;
computer usable program code configured to issue the
second portion when it is the oldest ready instruction;
and computer usable program code configured to de-allocate the side queue slot.

14. A processor, comprising a computer program product for double issue complex instructions, the computer program product comprising:
- a non-transitory computer useable storage medium having computer useable program code therewith, the computer useable program code comprising:
- computer usable program code configured to receive a complex instruction comprising a first portion and a second portion;
- computer usable program code configured to set an issue queue slot for the complex instruction;
- computer usable program code configured to allocate an execution unit for the execution of the complex instruction;
- computer usable program code configured to identify first portion dependencies in the first portion;
- computer usable program code configured to identify second portion dependencies in the second portion;
- computer usable program code configured to forward the second portion to a side queue;
- computer usable program code configured to set a dependency matrix slot based on the issue queue slot, the second portion, and the second portion dependencies;
- computer usable program code configured to determine whether the first portion dependencies have been satisfied, and to issue the first portion from the issue queue slot;
- computer usable program code configured to determine whether the second portion dependencies have been satisfied;
- computer usable program code configured to, in the event the second portion dependencies have not been satisfied, wait until the second portion dependencies have been satisfied;
- computer usable program code configured to, in the event the second portion dependencies have been satisfied, mark the second portion as ready for issue;
- computer usable program code configured to issue the second portion when it is the oldest ready instruction; and
- computer usable program code configured to de-allocate the side queue slot.

15. The computer program product of claim 14, further comprising computer usable program code configured to, in the event the side queue is full, hold dispatch when a subsequent double issue instruction tries to dispatch.

16. The computer program product of claim 14, further comprising:
- computer usable program code configured to, in the event the side queue is full:
  - push the second portion into the side queue;
  - remove an instruction from the side queue; and
  - process the removed instruction.

* * * * *